United States Patent [19]

Plentz

[11] 4,066,153
[45] Jan. 3, 1978

[54] BRAKE CYLINDER FOR A HYDRAULIC BRAKE

[76] Inventor: Rudolf Plentz, Talstrasse 18, 6534 Stromberg, Germany

[21] Appl. No.: 717,762

[22] Filed: Aug. 26, 1976

[30] Foreign Application Priority Data

Aug. 29, 1975 Germany .................. 7527323[U]

[51] Int. Cl.² .................................... F16D 65/46
[52] U.S. Cl. ................... 188/196 M; 92/129
[58] Field of Search ............ 188/72.4, 72.5, 71.7, 188/72.6, 73.1, 73.3, 370, 196 M, 72.1, 72.3, 363, 364, 368, 369, 216, 264 G; 92/63-64, 129, 245; 192/85

[56] References Cited

U.S. PATENT DOCUMENTS

| 2,175,431 | 10/1939 | Ericson | 188/364 X |
| 2,359,516 | 10/1944 | Frank | 188/72.4 X |
| 2,571,486 | 10/1951 | Reynolds | 188/364 X |
| 2,801,714 | 8/1957 | Dotto | 188/264 G |
| 3,357,319 | 12/1967 | Hagerty | 92/245 |

FOREIGN PATENT DOCUMENTS

| 1,351,786 | 12/1963 | France | 188/370 |

*Primary Examiner*—Trygve M. Blix
*Assistant Examiner*—Douglas C. Butler
*Attorney, Agent, or Firm*—Webb, Burden, Robinson & Webb

[57] ABSTRACT

A brake cylinder for a hydraulic brake is constructed to have a resilient body between its piston and the brake fluid and to have a free space between the resilient body and the piston. The free space is free of hydraulic fluid and provides a space for the resilient body to occupy upon rise in the pressure of the brake fluid.

7 Claims, 1 Drawing Figure

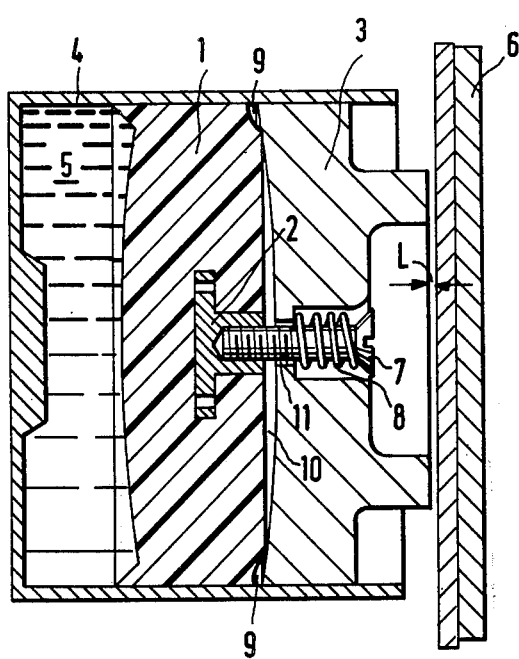

BRAKE CYLINDER FOR A HYDRAULIC BRAKE

This invention relates to a brake cylinder of an hydraulic brake, more especially of a disc brake for a motor vehicle.

Known hydraulic disc brakes for motor vehicles have the disadvantage that they lead to locking of the motor vehicle's wheels if, at an instant of danger, the driver should actuate the hydraulic brake more severely than usual. Locking-free hydraulic brake systems have, indeed, been developed with the aid of electronic component parts. However, because they are relatively complicated and the fact that they are consequentially susceptible to breakdown, these brake systems have hitherto not gained acceptance in practice.

The problem underlying the present invention is to provide an hydraulic braking system for motor vehicles which is constructed in an extremely simple manner, which provides for locking-free braking, and which moreover affords the possibility of adjusting the four brake cylinders of a motor vehicle uniformly in such a way that the clearances and the braking forces are equal. In the hydraulic brakes known nowadays, usually a metal piston is sealed by a rubber sealing ring which is located in an oblique recess in the brake cylinder and is compressed upon braking movement of the metal piston. Upon termination of the braking operation, the rubber sealing ring pushes the brake piston backwards by a very small distance amounting to about 0.3 mm. This backward movement is called "easing clearance". The known sealing means and the easing clearance of the brakes give the disadvantage that the easing clearance is not adjustable or controllable, and different easing clearance distances, which can be traced back to manufacturing tolerances, can arise. In almost all cases, manufacturing tolerances for the piston, sealing ring, sealing ring grooves and cylinder bore together result in non-uniform easing clearances at the brakes and thus result in two different braking effects occurring on one axle of the vehicle, which leads to pulling to one side or the other the vehicle upon braking. Statisticians estimate that 30% of all newly-licensed vehicles have these defects in their braking systems.

This problem is solved in the arrangement of the present invention which provides a resilient body between a piston of the brake, and brake fluid in the cylinder, there being a free space between the piston and the resilient body, which free space is free of brake fluid, and into which the resilient body penetrates upon a pressure rise in the brake fluid. By appropriately dimensioning the free space, which is free of brake fluid, and by suitable choice of the resilient body, it is in one's power to limit the pressure that is to be transmitted substantially without energy loss, from the brake fluid to the brake piston. Further pressure rise in the brake fluid is, then, not transmitted to the brake piston, but is taken up by free space which is free of brake fluid and into which part of the resilient body is forced.

Advantageously the free space is defined by a recess in the resilient body and has the form of an edge groove.

The brake piston and the resilient body are advantageously connected together by an adjustable connecting member, more especially in the form of an adjusting screw which is braced relative to the brake piston by a helical spring and which engages through said piston and which is screwed into the rubber-elastic body.

A threaded flange for the adjusting screw can be fastened to the rubber-elastic body.

For the provision of an adjustable easing clearance it is desirable for the adjustable connecting member to engage through a hollow space which is free of the brake fluid and which is arranged between the brake piston and the resilient body and into which the resilient body penetrates upon a pressure increase in the brake fluid along with entrainment of the connecting member by the extent of the easing clearance.

The hollow space for the easing clearance advantageously consists of a recess of the brake piston and may have the form of a trough.

One embodiment of the brake cylinder of the invention will now be explained in more detail with reference to the accompanying drawing in which the single FIGURE is a sectional side view of the said embodiment.

In the drawing, a brake cylinder 4 encloses a space filled with brake fluid 5 and a brake piston 3. The brake piston 3 is caused to move, by increase in the amount of brake fluid and corresponding pressure rise, from left to right until it is in abutment against a brake disc 6, on which a desired braking force is then exerted.

Arranged between the brake piston 3 and the brake fluid 5 is a resilient body 1, and there remains, between the body 1, and the brake piston 3, a small free space 9 which is free from brake fluid.

In the embodiment of the invention shown in the drawing, the free space 9 is provided by a recess of the resilient body 1 and is in the form of an edge groove. This free space 9 has the task of receiving parts of the rubber-elastic body 1 after a specific pressure limit has been exceeded, so that any further pressure rise is kept away from the piston 3 and is, instead, converted into elastic deformation work in the resilient body 1.

The resilient body 1 is advantageously connected by means of an adjusting screw 7 to the piston 3. This adjusting screw 7 engages through a bore 11 through the piston 3 and is braced relative to the latter with a helical spring 8. The adjusting screw 7 is simultaneously screwed into the rubber-elastic body 1 which, for this purpose, is equipped with a suitable threaded flange 2 cast-in in the body.

Arranged between the resilient body and the brake piston 3 is a further hollow space 10 through which the adjusting screw engages and into which the rubber-elastic body 1 penetrates, upon pressure rise in the brake fluid along with entrainment of the adjusting screw to the extent of the desired easing clearance. In the example shown in the drawing, the hollow space for the easing clearance is provided by a trough in the brake piston 3, the depth of which trough corresponds to the easing clearance L between the brake piston 3 and the brake disc 6. Upon a pressure rise occurring in the brake fluid 5, initially the entire trough-shaped hollow space 10 is filled by corresponding deformation of the resilient body 1, before the further pressure rise is then transmitted as braking force to the brake disc 6.

By twisting the adjusting screw 7, the helical spring 8 is tautened more severely or more weakly, so that in this way the easing clearance path can be adjusted as required. After conclusion of the braking operation, the original easing clearance again arises in that the resilient body 1 again springs back into its original shape and in so doing simultaneously draws the brake piston 3 along by the easing clearance path from right to left.

The described brake cylinder thus provides for the creation of a blocking-free gentle braking force which is distributed in a completely uniform manner.

I claim:

1. In a brake cylinder of a hydraulic brake comprising a piston moving within said cylinder, the improvement comprising a solid resilient body between said piston and brake fluid in the cylinder, said resilient body having a face abutting the brake fluid, edges that abut the walls of the cylinder, and yet another face adjacent the face of the piston, there being a free space between the piston and the adjacent face of the resilient body, which space is free of brake fluid and into which the resilient body penetrates upon a pressure rise in the brake cylinder, said brake piston and resilient body being adjustably connected by a connecting member biased toward the brake piston by a spring, said member passing through the piston and being fixed to the resilient body.

2. The improvement as claimed in claim 1, in which the free space is defined by a recess in the resilient body.

3. The improvement as claimed in claim 2, in which the recess has the form of a groove about the said edges of the resilient body.

4. The improvement in claim 1 in which the connecting member is threaded and a threaded flange for receiving the connecting member is fastened to the resilient body.

5. The improvement in claim 1, in which the connecting member passes through a hollow space which is free of the brake fluid and which is arranged between the brake piston and the resilient body and into which the resilient body penetrates upon a pressure rise in the brake fluid thereby carrying the connecting member to the extent of an easing clearance.

6. The improvement in claim 5, in which the hollow space is provided by a recess of the brake piston.

7. The improvement in claim 6, in which the recess takes the form of a trough.

* * * * *